US008252186B1

(12) United States Patent
Blake et al.

(10) Patent No.: US 8,252,186 B1
(45) Date of Patent: Aug. 28, 2012

(54) MAKING AND USING POROUS ACRYLONITRILE-BASED HYDROGEL PARTICLES TO TREAT WATER

(75) Inventors: Diane A. Blake, Mandeville, LA (US); Nurettin Sahiner, Canakkale (TR)

(73) Assignee: The Administrators of the Tulane Educational Fund, New Orleans, LA (US)

( * ) Notice: Subject to any disclaimer, the term of this patent is extended or adjusted under 35 U.S.C. 154(b) by 704 days.

(21) Appl. No.: 12/274,976

(22) Filed: Nov. 20, 2008

Related U.S. Application Data

(60) Provisional application No. 61/003,745, filed on Nov. 20, 2007.

(51) Int. Cl.
*C02F 1/42* (2006.01)

(52) U.S. Cl. .......................... 210/681; 210/684; 210/688

(58) Field of Classification Search .................. 210/681, 210/684, 688
See application file for complete search history.

(56) References Cited

U.S. PATENT DOCUMENTS

| | | | | |
|---|---|---|---|---|
| 4,272,422 A | * | 6/1981 | Tanaka | 524/566 |
| 5,015,448 A | * | 5/1991 | Vorlop et al. | 423/24 |
| 5,276,103 A | * | 1/1994 | Yoshiaki et al. | 525/329.1 |
| 5,578,217 A | | 11/1996 | Unger et al. | |
| 6,852,233 B1 | * | 2/2005 | Katakai et al. | 210/672 |
| 2005/0025911 A1 | * | 2/2005 | Kasperchik et al. | 428/32.1 |

* cited by examiner

*Primary Examiner* — Chester Barry
(74) *Attorney, Agent, or Firm* — Garvey, Smith, Nehrbass & North, L.L.C.; Charles C. Garvey, Jr.; Seth M. Nehrbass (57) ABSTRACT

Novel compositions of matter synthesized from acrylonitrile and crosslinker, and subsequently coated with various hydrophilic monomers, can be used in the remediation of uranyl ions from groundwater, drinking water, or wastewater and as part of a system for measurement of uranium in environmental and biological samples.

25 Claims, 7 Drawing Sheets

MAKING AND USING POROUS ACRYLONITRILE-BASED HYDROGEL PARTICLES TO TREAT WATER

CROSS-REFERENCE TO RELATED APPLICATIONS

Priority of our U.S. Provisional Patent Application Ser. No. 61/003,745, filed 20 Nov. 2007, incorporated herein by reference, is hereby claimed.

STATEMENT REGARDING FEDERALLY SPONSORED RESEARCH OR DEVELOPMENT

The work described herein was supported by the Office of Science (BER) of the US DOE, Grant DE-FG-98ER62704. The US government may have rights in this invention.

REFERENCE TO A "MICROFICHE APPENDIX"

Not applicable

BACKGROUND OF THE INVENTION

1. Field of the Invention

The present invention relates to a method of removing heavy metals from water (e.g. in environmental and biological samples) using highly porous hydrogel particles. More particularly, the present invention relates to a composition of matter for highly porous acrylonitrile-based micron- and sub-micron-sized hydrogel particles for use in remediation of soluble uranium ions in water (e.g. groundwater and wastewater) and as part of a system for measurement of uranium in environmental and biological samples.

2. General Background of the Invention

Uranium is a naturally occurring radioactive metal that occurs in low concentrations in nature. It is present in certain types of soils and rocks, especially granites. Naturally occurring uranium in groundwater is a result of the dissolution of uranium bearing minerals that have been in contact with groundwater for long periods of time. Elevated concentrations of natural uranium in well water are more likely to be found in drilled wells that obtain their water from the cracks and fractures of bedrock, rather than dug wells or surface water supplies. Uranium can also be found in the environment as a result of human activities such as mill tailings, emissions from the nuclear industry, the use of phosphate fertilizers and the combustion of coal and other fuels.

Naturally occurring uranium has very low levels of radioactivity. The chemical properties of uranium in drinking water are of greater health concern than its radioactivity. Most ingested uranium is due to food intake with lesser amounts accumulated from water or from the air. Most ingested uranium is rapidly eliminated from the body, however a small amount is absorbed and carried through the blood stream and deposited in the kidney, muscle and bone. Chronic exposure to uranium in drinking water is associated with altered kidney function without a clear threshold, which suggests that even low uranium levels can cause kidney damage. Current research shows that the safe concentration in drinking water may be close to the value promulgated by the U.S. Environmental Protection Agency, 30 parts per billion (ppb). Bathing and showering with water that contains uranium is not considered a health concern. There is inadequate data available to evaluate the carcinogenicity of ingested uranium.

The two most common methods of removing uranium from drinking water are reverse osmosis and ion exchange. Reverse osmosis works by force-driven water filtering through a membrane that prevents the uranium and other metals from passing through. Reverse osmosis systems require regular maintenance and quality monitoring and are fairly costly to implement. In addition, reverse osmosis systems do not specifically remove only one type of metal ion; they remove beneficial metals in addition to uranium.

One form of ion exchange works by passing water through a system that replaces uranium with a safer compound. Such ion exchange systems require regular maintenance and quality monitoring and are fairly costly to implement. Again, these systems are not specific to uranium but remove almost all the metal ions in the drinking water.

Another form of ion exchange involves the application of specific resins to the water supply. Ion-exchange resins are light and porous solids, usually prepared in the form of granules, beads, or sheets. When immersed in solution, the resins absorb the solution and swell; the degree of swelling is dependent on the polymeric structure and the total ion concentration of the solution. In industrial and domestic applications, ion-exchange resins are used for the removal of calcium, magnesium, iron, and manganese salts from water (water softening), for purification of sugar, and for concentration of valuable elements, such as gold, silver, and uranium from mineral ores. The ion exchange resins with specificity for uranium are very expensive, and require relatively long times (~60 minutes) to remove uranium from environmental water samples.

The costs for the detection and measurement of uranium are presently high due to the complex methodologies required for analyses. Most analyses must be conducted in centralized facilities with costly instrumentation. The measurement of uranium thus requires transportation of the sample to the laboratory, and samples must often sit in long queues before analysis. Both of these factors lead to a significant delay between sample collection and analysis. There is an urgent need for lower cost, field portable assays that can provide reliable, near real-time data about uranium contamination at the contaminated site.

There is thus a need for more efficient and less costly methods of removing uranyl ions from water supplies and for measuring uranium in environmental and biological samples. The present invention meets these needs by providing a composition that is easily produced, yet is highly sensitive to uranyl ions. It removes uranium (uranyl ions) from water or other samples efficiently and effectively, while having a minimal effect on the other ions in the water sample. This composition can be used for treatment of water samples or as part of a test device to remove all the uranium from an environmental water sample. This treated water sample can subsequently be used as a control in the evaluation of water samples by an antibody-based test device. The present invention can be shown to be more sensitive and more effective than other compositions currently available.

BRIEF SUMMARY OF THE INVENTION

The present invention relates to novel compositions of matter synthesized preferably from acrylonitrile and its co-polymers. The resulting particles are preferably highly porous and capable of selectively absorbing uranyl from aqueous environments, including but not limited to groundwater, surface water and wastewater. They may also be used as part of a system for measurement of uranium in environmental and biological samples.

The present invention involves novel compositions of matter, and a method of remediation of uranium ions (e.g. uranyl)

from water (e.g. wastewater, groundwater, drinking water) and as part of a system for measurement of uranium in environmental and biological samples.

The particles of the present invention are preferably synthesized from acrylonitrile and the cross-linker ethylene glycol dimethacrylate. These particles are subsequently coated with a hydrophilic monomer. The monomer can be (but is not limited to) 1-vinyl 2-pyrrolidone (1-VP), 2-hydroxy ethylmethacrylate (Hema), acrylic acid (AAc) or methacrylic acid (Mac). Other monomers which would likely work well are acrylamide (AAm) and 2-hydroxypropyl methacrylate (HPMA), as they share the hydrophilic properties with the four preferred monomers.

There are many monomers that can be used to make particles but that can not be converted to amidoxime groups for the uranyl ions. We chose AN (acrylinonitrile) as the main monomer (core) so that we can convert the amidoxime groups. The second monomers are hydrophilic to facilitate amidoxime reaction and help the structure to become more hydrophilic. Being more hydrophilic, it can take water inside readily (and also toxic metals along with it). Thus, the invention can be considered to include acrylonitrile based micron and submicron particles.

The material of the present invention is highly porous. Experiments indicate that when the particles are together in bulk, they have a gross porosity of 80-95% (that is when a given volume of particles, say 1 ml, is mixed with a given volume of fluid, say 1 ml, the resulting volume is 1.05-1.20 ml, indicating that 80-95% of the fluid enters pores in the particles and the space between the particles). This high porosity makes the particles quite efficient at trapping uranium, as a great deal of the surface area of the particles is available to capture uranium.

The need for a method to rapidly remove a radionuclide ($UO_2^{2+}$) from environmental water samples has led to the development of these microsize and nanosize particles containing an acrylonitrile (AN) core. A miniemulsion polymerization technique was employed for the preparation of a variety of particle morphologies, which were generated by employing ethylene glycol dimethacrylate as the crosslinker and 2-hydroxymethacrylate, 1-vinyl-2-pyrrolidone, acrylic acid, and methacrylic acid as co-monomers after an initial seed polymerization with AN. The particles were characterized by transmission electron spectroscopy, scanning electron microscopy (SEM) and cryo-SEM. The chemical conversion of nitrile groups on the particles to amidoxime groups was verified with Fourier transform infrared spectroscopy. The amidoximated particles were superior to a commercially available resin in their ability to rapidly remove dissolved $UO_2^{2+}$ from spiked groundwater samples.

The present invention also includes a method of reducing the amount of uranium in water. For example, the method disclosed herein can reduce the amount of uranium in water from levels of about 10 ppb-100 ppm (10 parts per billion to 100 parts per million) to below about 60 ppt-10 ppb (60 parts per trillion to 10 parts per billion), in a time period of about 1-60 minutes, or even less time (such as 1-5 minutes). Also, the method disclosed herein can reduce the amount of uranium in water from a level of at least about 1 ppm to below about 30 ppb, in a time period of less than about 5 minutes. In general, higher levels of uranium in water require more product of the present invention to remove the uranium from the water.

Additional advantages of the invention will be set forth in part in the description which follows, and in part will be obvious from the description, or may be learned by practice of the invention. The advantages of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE SEVERAL VIEWS OF THE DRAWINGS

For a further understanding of the nature, objects, and advantages of the present invention, reference should be had to the following detailed description, read in conjunction with the following drawings, wherein like reference numerals denote like elements and wherein:

FIG. 1 is a schematic of the immuno sensor method for uranium analysis. The particles described herein would be used in this method to remove all the uranium from environmental water samples. The treated water samples (minus uranium) would subsequently be used as controls in the uranium the assay system, thus making this assay system more rugged and resistant to effects of the sample matrix. (a) Sample containing the chelated uranium (U) is mixed with the fluorescently labeled antibody (Y*) and the reaction mixture is allowed to come to equilibrium. (b) The equilibrated antibody-antigen complex is then passed rapidly over an immobilized form of the chelated uranium (U—O) present on the surface of the microbeads in the capillary flow/observation cell. Only those antibodies without chelated uranium in their binding sites are available to bind to the beads. (c) Instrumental traces from reaction mixtures containing increasing amounts of chelated uranium. The instrument monitors fluorescence continuously from the injection of the sample until the end of a buffer wash. Delta signal is calculated by subtracting the baseline signal at the beginning of each trace (see dotted line) from the signal at the end of each trace. (d) A plot of Delta signal versus uranium concentration. Three to five replicates are shown for each uranium concentration;

FIG. 2 is a scheme of copolymeric particle syntheses based on acrylonitrile (AN). The figure illustrates p(AN) based (sub)micron (micrometer and nanometer) particle syntheses in sodium dodecyl sulfate (SDS) micelles. Acrylonitrile (AN) partitions into the hydrophobic interior of the micelles and is polymerized into submicron particles. This hydrophobic core is then coated with a hydrophilic layer using a variety of monomers including but not limited to 1-vinyl 2-pyrrolidone (1-VP), 2-hydroxy ethylmethacrylate (Hema), acrylic acid (AAc), methacrylic acid (MAc);

DETAILED DESCRIPTION OF THE INVENTION

Before the present compounds, compositions, articles, devices, and/or methods are disclosed and described, it is to be understood that this invention is not limited to specific synthetic methods; specific methods may, of course, vary. It is also to be understood that the terminology used herein is for the purpose of describing particular embodiments only and is not intended to be limiting.

In this specification and in the claims which follow, reference will be made to a number of terms which shall be defined to have the following meanings:

It must be noted that, as used in the specification and the appended claims, the singular forms "a," "an," and "the" include plural referents unless the context clearly dictates otherwise. Thus, for example, reference to "an oxidizing agent" includes mixtures of oxidizing agents, reference to "a reducing agent" includes mixtures of two or more such reducing agents, and the like.

Ranges may be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

References in the specification and concluding claims to parts by weight, of a particular element or component in a composition or article, denotes the weight relationship between the element or component and any other elements or components in the composition or article for which a part by weight is expressed. Thus, in a compound containing 2 parts by weight of component X and 5 parts by weight component Y, X and Y are present at a weight ratio of 2:5, and are present in such ratio regardless of whether additional components are contained in the compound.

A weight percent of a component, unless specifically stated to the contrary, is based on the total weight of the formulation or composition in which the component is included.

"Optional" or "optionally" means that the subsequently described event or circumstance may or may not occur, and that the description includes instances where said event or circumstance occurs and instances where it does not.

By the term "effective amount" of a composition or property as provided herein is meant such amount as is capable of performing the function of the composition or property for which an effective amount is expressed. As will be pointed out below, the exact amount required will vary from process to process, depending on recognized variables such as the compositions employed and the processing conditions observed. Thus, it is not possible to specify an exact "effective amount." However, an appropriate effective amount may be determined by one of ordinary skill in the art using only routine experimentation.

1. Introduction

Figure 1:
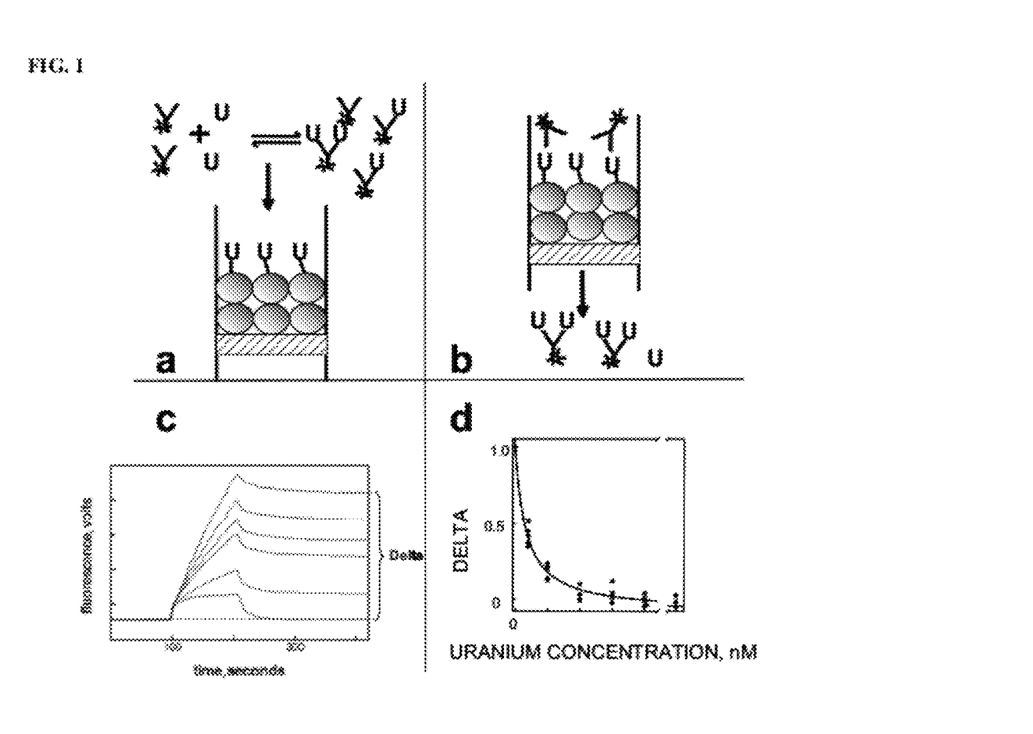

There is an urgent need in analytical processes for collection and concentration procedures that are rapid, simple and selective. The high surface-to-volume ratio of micron- and submicron-sized particles makes these relatively new polymer products a highly attractive alternative to more classical sample preparation methods (including ion exchange, solid-phase extraction, and reverse osmosis). In our laboratory, the need for submicron particles that could rapidly remove uranium from environmental water samples arose during the development of an antibody-based sensor for hexavalent uranium ($UO_2^2$) [1, 2]. The operation of this immunosensor, which is based on the principles of kinetic exclusion [3], is shown schematically in FIG. 1. An environmental sample is mixed with a uranium-specific chelator and then with a fluorescently-labeled antibody (Y* in FIG. 1a) that recognizes the chelated uranium. Once the solution has come to binding equilibrium (5-15 minutes), it is passed rapidly through a microcolumn that contains an immobilized form of the chelated uranium (U—O in FIGS. 1a and b). Antibody molecules with chelated uranium already in their binding sites will flow through the microcolumn without interacting; only antibody molecules with free binding sites interact with the immobilized ligand on the column (FIG. 1b). Actual instrumental traces from the sensor are shown in FIG. 1c. The instrument measures the fluorescent signal as the antibody flows through and interacts with the microcolumn; it calculates Delta fluorescence (defined as the difference in the signal at the beginning and the end of each trace) for each experimental sample or calibrator (FIG. 1c). As the concentration of uranium increases, the Delta decreases, and a standard curve can be generated (FIG. 1d) from which uranium concentration can be determined.

The ability to rapidly adsorb uranium from an environmental water sample is very important to the transition of this sensor project from the laboratory to the field. Such an adsorbent could be used both for concentration of the uranium in dilute samples (after a specific elution step) or to prepare a "uranium-free" sample matrix for use during instrument calibration. Although commercial uranium-specific adsorbents are available, our preliminary tests showed that it took almost 60 minutes to adsorb the uranium from groundwater samples, even when we used a relatively high resin/sample ratio. We therefore decided to explore submicron particles as a faster and more efficient way to treat environmental water samples.

The high surface-to-volume ratios that are characteristic of nanoparticles can be achieved via degradation of bulk materials or by formation via self-assembly processes. One of the most popular self-assembly methods for nanoparticle synthesis is the reverse micelle system, and nanoparticles composed of silica [4, 5], iron oxide [6], cuprous oxide [7, 8], titanium dioxide [9], and acrylamide [10] have all been synthesized by variations of this method. Hydrogels have been investigated intensively over last several decades for a variety of applications [11-15]. The characteristic properties of these polymers, including hydrophilic/hydrophobic balance, porous network structure, compatibility with biological systems, and the facility for further modification with drugs and biomolecules, have made hydrogel materials indispensable as scaffolds for tissue regeneration, templates for composite material synthesis and absorbents for environmental applications [16, 17]. The preparation of polymer particles in the (sub)micron range has been afforded only from relatively hydrophobic monomers with solubility less than 2 wt % in water (e.g., styrene and methylmethacrylate). Furthermore, the preparation of (sub)micron particles from hydrophilic monomers has been very difficult by dispersion polymerization [1,8]. Although emulsion polymerization is one of the most commonly employed methods for the preparation of polymer particles, there are relatively few studies reported for hydrogel particle syntheses, which generally require reverse emulsion polymerization [10, 19]. The frequently used seed polymerization technique has been limited to polymers composed of p(styrene) and p(N-isopropylacrylamide) [20, 21], their hydrophobic copolymers [22, 23] and few other hydrophilic copolymers such as p(acrylic acid) [24] and p(methacrylic acid) [25, 26].

Herein, we report the utilization of a miniemulsion polymerization to prepare acrylonitrile (AN)-based hydrogel seed particles. AN was chosen as the seed material because the cyano (nitrile) groups in AN provide a unique site for further functionalization. The seed particles were subsequently modified by adding relatively hydrophilic monomers such as 1-vinyl-2-pyrrolidone (1-VP), 2-hydroxy ethylmethacrylate (HEMA), methacrylic acid (MAc), and acrylic acid (AAc) to prepare particles with different morphologies. Additionally, we demonstrate that the nitrile groups on the acrylonitrile moieties of the copolymeric particles can be converted to amidoxime groups. The amidoximated AN-based particles were much faster than a commercially available resin in absorbing soluble uranium from a spiked groundwater sample.

2. Experimental
2.1 Materials

The monomers, AN (99+%), 1-VP (99+%), HEMA (97%), AAc (99%), MAc (99%), the crosslinker, ethylene glycol dimethacrylate (EGDMA) (98%), the initiators, ammonium persulfate (APS) (98%) and 2,2-dimethoxy-2-phenyl-acetophenone (DPA), the salts used to prepare an artificial groundwater composite sample ($CaCl_2.2H_2O$; $CaSO_4.2H_2O$; $Ca(NO_3)_2.4H_2O$; $MgCl_2.6H_2O$; $NaNO_3$; KCl, and $MnCl_2.4H_2O$) and the $NH_2OH.HCl$ (98%) used for the amidoximation reaction were obtained from Sigma-Aldrich Chem. Co. (Milwaukee, Wis.) and used as received. The surfactant, sodium dodecyl sulfate (SDS) ($\leqq$98%) was purchased from Bio-Rad Laboratories (Hercules, Calif.). Purified water (18.3 Mohm.cm) from a Nanopure Diamond purifier (Barnstead) was used for preparation of all aqueous solutions. Monoclonal antibodies with specificity for chelated uranyl ions and the chelator, 2,9-dicarboxyl-1,10-phenanthroline (DCP) were available from previous studies [2, 27]. A Cy5-labeled Fab fragment of goat anti-mouse IgG was a product of Jackson ImmunoResearch Laboratories (West Grove, Pa.). TRU® and UTEVA® resins were purchased from Eichrom (Darien, Ill.). IC Millex filter units (13 mm diameter, 0.2 μm pore size) were a product of Millipore, Inc. (Billerica, Mass.). Uranyl acetate used to spike groundwater samples was a product of Mallinckrodt, Inc. (Hazelwood, Mo.).

2.2 Synthesis of Submicron Particles

A miniemulsion system was used for the synthesis of submicron hydrogel particles. The relatively hydrophobic acrylonitrile (AN) monomer was loaded into micelles of a surfactant, sodium dodecyl sulfate (SDS) in aqueous solution and simultaneously cross-linked and polymerized. In a typical experiment, 0.3 mL AN was dispersed in 15 mL 0.1M SDS aqueous solution. To this solution was added the crosslinking agent, ethylene glycol dimethacrylate (EGDMA, 2.5-10% based on AN monomer mole ratio). The mixture was vortexed until a clear solution was obtained. The simultaneous polymerization and cross-linking reaction was initiated by the addition of ammonium persulfate (APS, 1.25% based on moles of AN, dissolved in 1 mL of water). The reaction proceeded under constant mixing (750 rpm) at 75° C. for 10 h. The particles formed during the reaction were then washed by adding an excess amount of water and centrifuging at 4000 rpm for 10 min. The exhaustive washing with water (at least 10 times) removed virtually all the surfactant. The particles were lyophilized after water washing.

For copolymeric particles, the AN monomer was loaded into SDS micelles and crosslinker EGDMA and initiator APS were added as described above. After reaction for 2 h at 75° C., other monomers, including 1-vinyl-2-pyrrolidone (1-VP), 2-hydroxy ethylmethacrylate (HEMA), methacrylic acid (MAc), or acrylic acid (AAc) were added to the reaction mixture in two different molar ratios with respect to AN (0.33 and 0.5). After vortexing thoroughly, these mixtures were allowed to react for an additional 8 h at 75° C. under constant mixing (750 rpm). The same washing procedure was followed as described above. The particles were lyophilized after water washing; the lyophilized particles were stored in a vacuum oven at ambient temperature for later use.

2.3 Amidoximation

The nitrile groups on the acrylonitrile moieties of the AN-HEMA and AN-MAc copolymeric particles were converted to amidoxime groups in an aqueous environment. The lyophilized particles were weighed (1.365 g) and the moles of AN contained in these particles was calculated based on the assumption that 100% the AN in the feed had been polymerized. Hydroxylamine hydrochloride (5-fold molar excess to p(AN)) was added to 200 mL water and neutralized with NaOH. The particles were subsequently added to this solution and the reaction mixture was stirred (750 rpm) for 24 h at 25° C. After the amidoximation reaction, the low molecular weight contaminants were removed from the polymer particles by 5 washes in an excess of water; the particles were centrifuged at 4000 rpm for 10 min before removing the supernatant.

2.4 Microstructure Analysis

Transmission electron microscopy (TEM) was performed using a JEOL 2010 Scanning Transmission Electron Microscope. Cleaned virgin and amidoximated particles were placed in Nanopure water and ultrasonicated about 5 minutes. A small drop of the sample solution was dropped onto 200 mesh carbon coated copper grid with formvar film, and dried in air. The samples were observed in vacuum at an accelerating voltage of 200 keV at room temperature.

Scanning electron microscopy (SEM) was performed using a Hitachi S-4800 Field Emission Electron microscope. A suspension of the AN-based particles in nanopure water was added to carbon tape attached to SEM stubs. The particles were dried at ambient temperature and sputter coated with ~5 nm of platinum/gold. SEM images were acquired at an operating voltage of 10 keV.

Cryo-SEM was performed on particles that had been allowed to swell overnight in Nanopure water. The water-swollen particles were mounted on the sample stage and rapidly plunged into liquid nitrogen slush at ~−190° C. (Gatan, Alto 2500). The sample was withdrawn into a vacuum transfer device under the protection of high vacuum and transferred into the cryo-preparation chamber, where the temperature was maintained at −130° C., with the anticontaminator at ~−188° C. The sample was sublimated for 5 to 10 minutes at −95° C. to etch away surface water, then the temperature of the stage was adjusted back to −130° C. and the sample was sputter coated with platinum at 10 mA for 100 seconds. The sample was subsequently transferred into the main chamber of a Field Emission SEM (Hitachi S-4800) via an interlocked airlock and mounted onto a cold stage module (−130° C.) fitted to the SEM stage. Images were acquired at a voltage of 3 keV and at a working distance of 8 to 13 mm.

The amidoximation reaction was verified via Fourier Transform Infrared Radiation (FT-IR) spectroscopy with a PerkinElmer FT-IR 1600 System Spectrum GX.

2.5 Treatment of Uranium-Spiked Groundwater Samples with Submicron Particles and Measurement of $UO_2^{2+}$ Using an Immunosensor-Based Assay.

Artificial groundwater with inorganic constituents similar to that at an uncontaminated site at Oak Ridge National Laboratory was prepared based on a formulation provided by Dr. Scott Brooks, Subsurface Science Group, Environmental Sciences Division, ORNL, Oak Ridge, Tenn. This artificial groundwater composite contained the following cations and anions: $Ca^{2+}$, 4.07 mM; $Me^{2+}$, 0.107 mM; $Na^+$, 0.076 mM; $K^+$, 0.016 mM; $Mn^{2+}$, 0.002 mM; $Cl^-$, 3.938 mM; $SO_4^{-2}$, 1.561 mM; $NO_3^-$, 1.383 mM. This artificial groundwater composite was subsequently spiked with 1 ppm (4.2 µM) of $UO_2^{2+}$ (as uranyl acetate).

To determine the time course of uranium absorption, lyophilized particles synthesized as described above or the commercially available TRU® resin were weighed into 2 mL vials and the spiked groundwater composite was added to achieve a final concentration of 16.7 mg of absorbing material per mL of the spiked groundwater. The samples were mixed to suspend the resins and the absorption was stopped by filtration of each sample through an IC Millex filter unit after varying times in contact with the particles. A spiked groundwater composite sample that had not been in contact with the resins was used as the control for these experiments.

The volume of the filtered solution was measured and mixed with an equal volume of a 2× concentrated Hepes-buffered saline stock solution containing 800 nM 2,9-dicarboxyl-1,10-phenanthroline (DCP) such that the final mixture contained 137 mM NaCl, 3 mM KCl, 10 mM Hepes buffer, pH 7.4, 50% of the $UO_2^{2+}$-spiked groundwater sample and 400 nM DCP. The samples were further diluted with Hepes-buffered saline (HBS, 137 mM NaCl, 3 mM KCl, 10 mM Hepes, pH 7.4) containing 400 nM DCP to reach the working range of the Inline Immunosensor (0.25-5.0 nM). The $UO_2^{2+}$ content in the control and each experimental sample was analyzed by a previously published procedure [1] in an assay mixture that contained 0.25 nM of monoclonal antibody 12F6 [2], 400 nM DCP and 5 nM Cy5 labeled Fab fragment of goat anti-mouse IgG in HBS. Samples were mixed and immunoassays were run autonomously in an automated Inline Immunosensor available from Sapidyne Instruments (Boise Id.).

The capacity of the amidoximated p(AN-c-MAc) particles for $UO_2^{2+}$ absorption was tested by diluting the original particle suspension (16.7 mg/mL) an additional 1:10, 1:100 and 1:1000 before addition of the groundwater composite spiked with 1 ppm of $UO_2^{2+}$. After 5 minutes of mixing in the presence of the particles, the samples were filtered and the $UO_2^{2+}$ remaining in the solution was measured as described above.

Cation selectivity was determined by performing inductively coupled plasma emission spectroscopy (ICP) on the $UO_2^{2+}$-spiked groundwater samples (described above) that had been treated for 5 minutes with 16.7 or 0.167 mg/mL of the amidoximated p(AN-c-MAc) particles. ICP was performed at the Tulane Coordinated Instrument Facility using a Perkin Elmer Optima 3000 Inductively-Coupled Plasma Atomic Emission Spectrometer.

3. Results and Discussion

Figure 2:
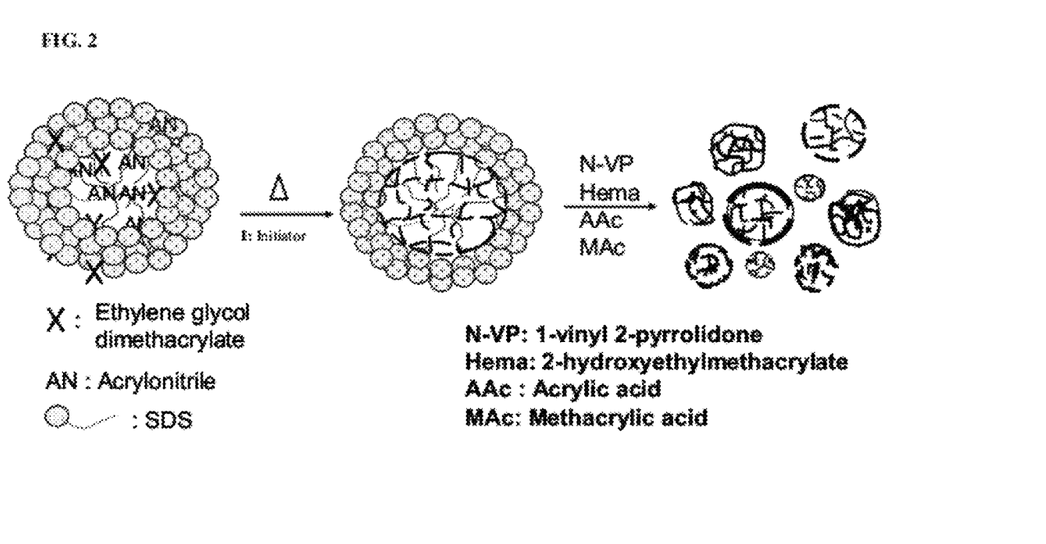

Preliminary work in our laboratory evaluated the use of bulk hydrogels [28, 29] for the absorption of radionuclides from groundwater samples [30]. Although these bulk gels were effective in removal of soluble $UO_2^{2+}$ from environmental samples, the time required for the process (>60 minutes) was too slow for our applications (data not shown). Because hydrogel particles are smaller in size and have a higher surface area per unit volume than bulk hydrogels [10] they would be expected have superior absorption kinetics. A miniemulsion method, shown schematically in FIG. 2, was therefore used to synthesize the particles described in this study. In the emulsion system used herein, AN would occupy primarily the hydrophobic center of SDS micelles because its solubility in water is relatively low (80 g/L) [31]. Concurrent addition of comonomers such as VP and AAc for copolymeric particle synthesis resulted in gel formation at higher feed ratios ($V_{AN} \geq 0.4$ mL and mole ratios of AN to comonomers: 1 to 1). However, it was possible to prepare particles with the lower feed ratios without the use of a seed polymerization technique by keeping the feed amounts of monomers very low. From our previous investigation, we found that AN's polymerization and crosslinking is around 50% at 75° C. for 2 h reaction time with 1% crosslinker ratio based on AN amount [32]. Based on this previous work and on the somewhat higher amount of crosslinker used in the present study (2.5% to 10% based on AN amount), we allowed the AN to polymerize for 2 h before the addition of any comonomers (VP, HEMA, AAc, or MAc). This allowed some seed p(AN) particles to form before the addition of comonomers. The reaction was then continued for 8 additional h after the addition of comonomers. Unless otherwise stated, the ratio of comonomer to AN was 1 to 3 based on AN amount for all the copolymeric particle syntheses. p(AN) particles without the comonomer shell were also prepared for comparison; these p(AN) particles were prepared with different % crosslinker (EGDMA) ratios at 75° C. and a 10 h reaction time.

Figure 3:
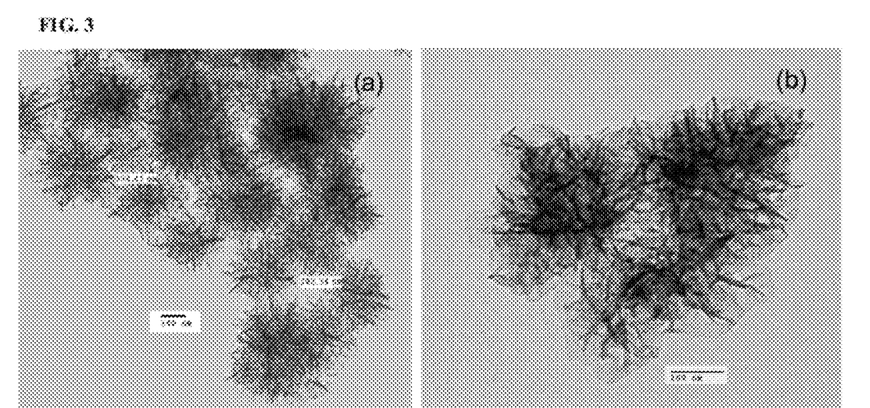
FIGS. 3a and 3b are transmission electron microscope (TEM) images of (a) 5% crosslinked and (b) 10% crosslinked p(AN) particles before addition of the hydrophilic shell. These images demonstrate large surface area available on these submicron particles.
Figure 4:
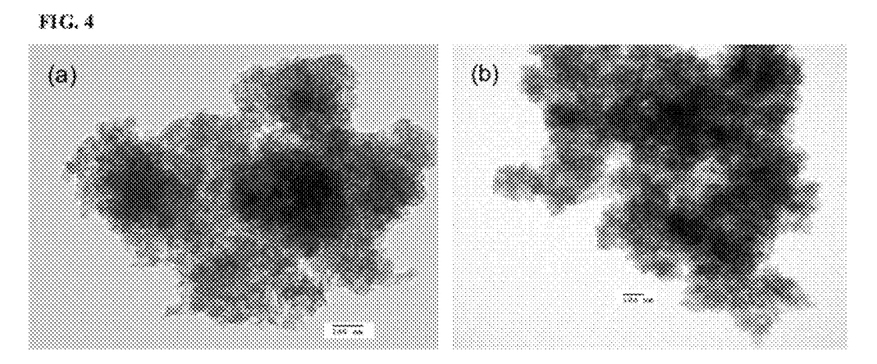
FIGS. 4a and 4b are transmission electron microscope (TEM) images of (a) 10% crosslinked acrylonitrile particles, coated with a shell of polymerized methacrylic acid, p(AN-c-MAc), (b) amidoximated 10% crosslinked p(AN-c-MAc) particles.
Figure 5:
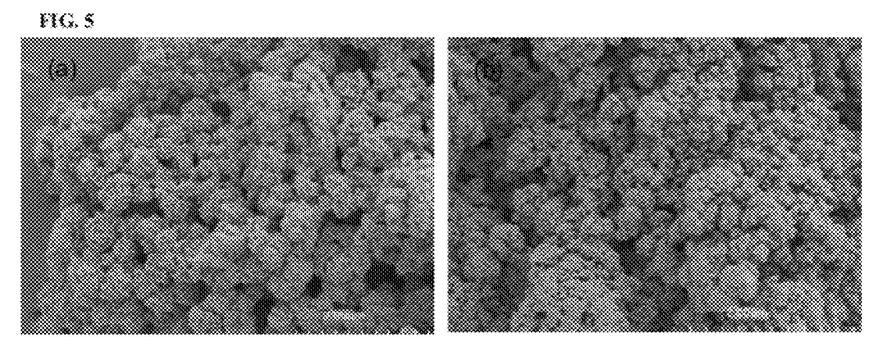
FIGS. 5a and 5b are scanning electron microscope (SEM) images of (a) 10% crosslinked p(AN) and (b) 10% crosslinked p(AN-c-MAc) particles. These images demonstrate the porosity and high surface area of these particles.

To understand the topographic features of the particles, we performed TEM, SEM and cryo-SEM studies, as shown in FIGS. 3-6. TEM of p(AN) particles without a copolymer shell are shown in FIG. 3. Panels (a) and (b) show particles made using 5 and 10% crosslinker ratios, respectively. Both conditions yielded particles with an interesting wrinkled architecture. The particulate form of the polymer is a consequence of synthesis in a microemulsion system, and collisions between the microemulsion droplets leads to highly interconnected particles. The voids between the particles are indicative of enhanced surface area compared to a bulk polymer. The addition of a copolymer shell composed of MAc, shown in FIG. 4(a), makes the morphology more diffuse. The diffuse structure is also observed upon amidoximation (FIG. 4(b)). We observe that the hydrophilicity enhancement upon amidoximation also facilitates spreading of the particles on a TEM grid. In bulk hydrogels made of these monomers (31) amidoximation leads to an enhancement in porosity as observed through TEM, but in this case with particles made in microemulsion droplets, the morphological distinctions between amidoximated and nonamidoximated particles are harder to observe. For the copolymeric particles prepared from other monomers (VP, HEMA, AAc) similar diffuse structures were also observed after amidoximation (data not shown).

Figure 6:
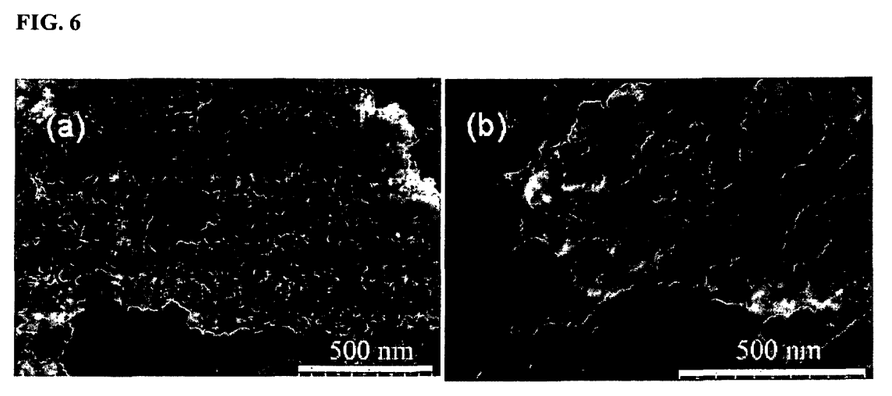
FIGS. 6a and 6b are Cryo-SEM images of (a) 10% crosslinked p(AN) and (b) 10% crosslinked p(AN-c-MAc) particles.

The SEM images of 10% crosslinked p(AN) and 10% crosslinked p(AN-c-MAc), shown in FIGS. 5(a) and (b) respectively, also confirmed porous structures of the interconnected polymer particles. The same particle samples were also examined by cryo-SEM, which allows observation of the sample in its natural hydrated state, as shown in FIGS. 6(a)

and (b). In these figures, the polymer appears to be made up of aggregates of small particles, rationalized by the mini-emulsion method used in the synthesis. Comparison of the images in FIGS. 5 and 6 also suggest that the hydrated particles that are swollen compared to samples that had undergone the critical point drying required by conventional SEM. Nevertheless, both the SEM and the cryo-SEM images indicate that these polymers are aggregates of smaller particles whose dimensions are on the order of 10-25 nm.

Figure 7:
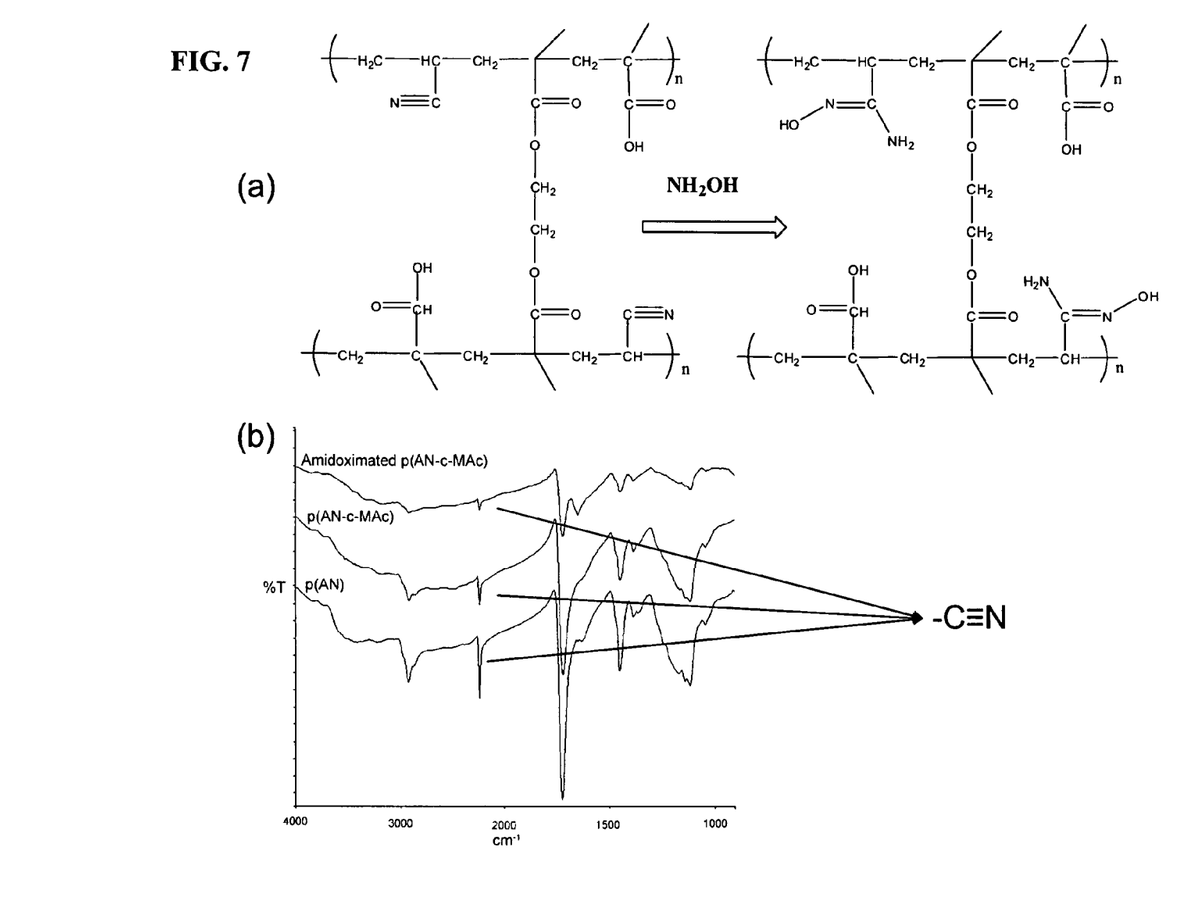
FIGS. 7a and 7b illustrate amidoximation reaction schemes of p(An-c-MAc) (a) and corresponding FT-IR images (b) which demonstrate the reduction in the intensity of nitrile band.

AN was as chosen as a seed material in this investigation because the cyano (nitrile) groups in AN provide unique site for further functionalization. In order to increase the hydrophilic character of the polymer particles and to increase their specificity for radionuclide binding, the nitrile groups of AN were converted to amidoxime groups (reaction mechanism shown in FIG. 7(a) [28]. FT-IR spectra of the particles revealed a band at 2240 cm$^{-1}$ belonging to the AN stretching vibration that diminished with the amidoximation reaction, as shown in FIG. 7(b). In addition, the bands around 2000 and 4000 broadened due to the newly formed —OH and —NH$_2$ stretching frequencies.

Figure 8:
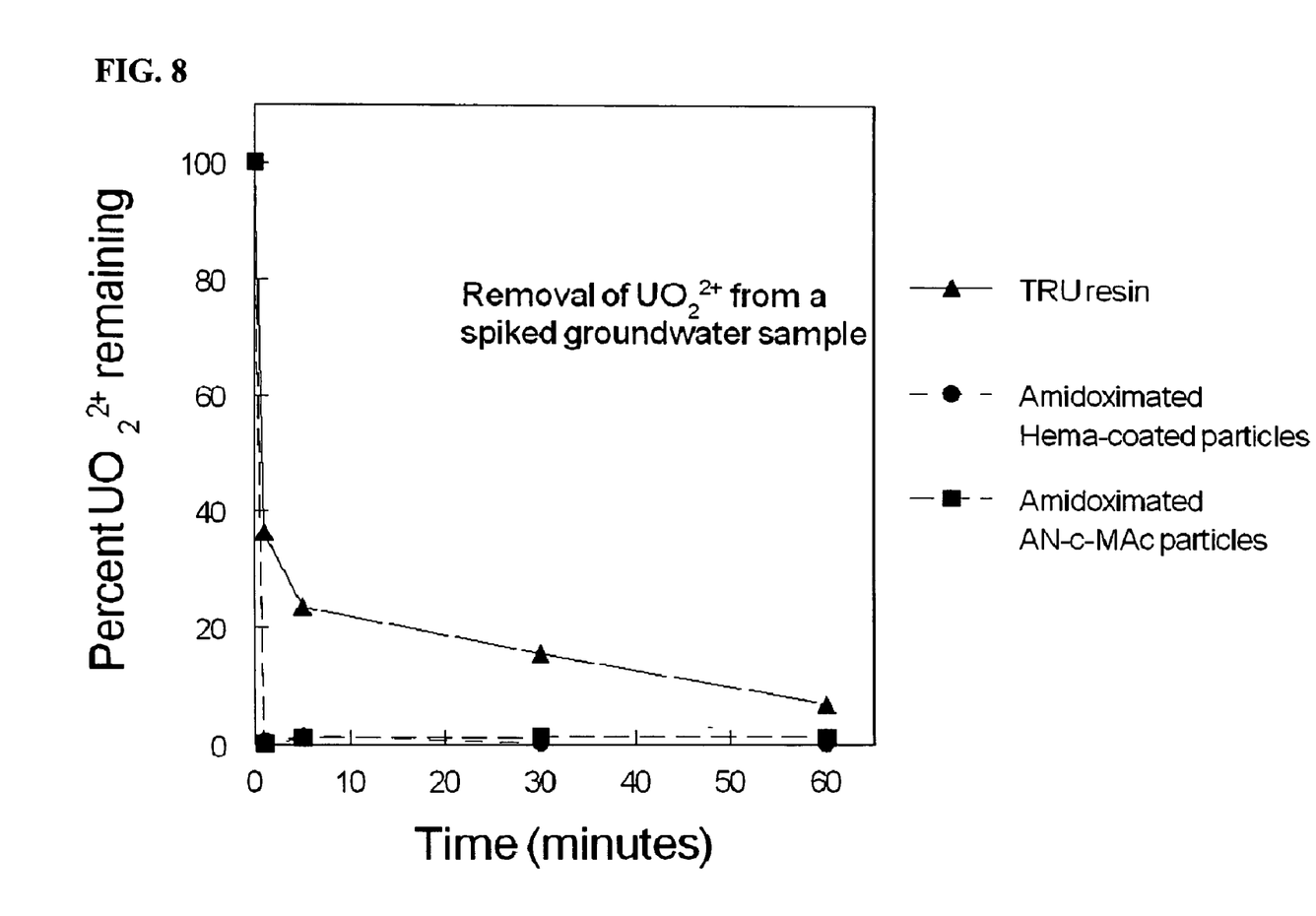
FIG. 8 illustrates time-dependence of uranium removal from a spiked groundwater sample using amidoximated p(AN)-c-HEMA particles (●), amidoximated p(AN)-c-Mac particles (■), or a commercially available resin (TRU®) (▲)
Figure 9:
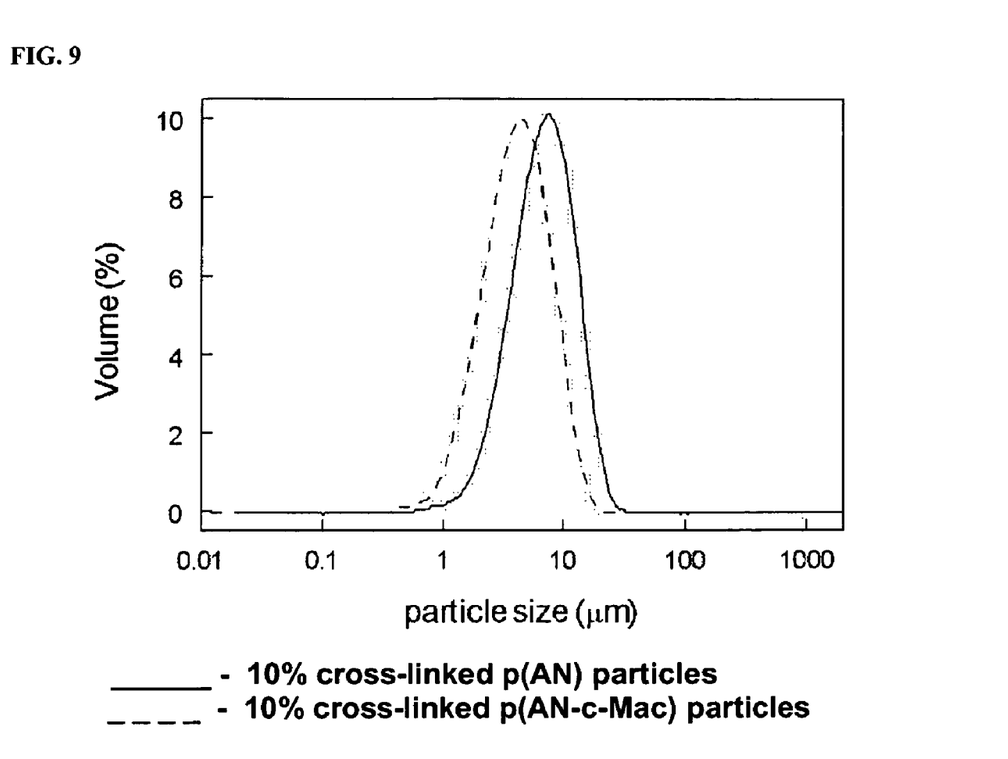
FIG. 9 shows the results of dynamic light scattering for ten percent (10%) crosslinked p(AN) particles (solid line) and ten percent (10%) crosslinked p(AN-c-MAc) particles (dashed line)
Figure 10:
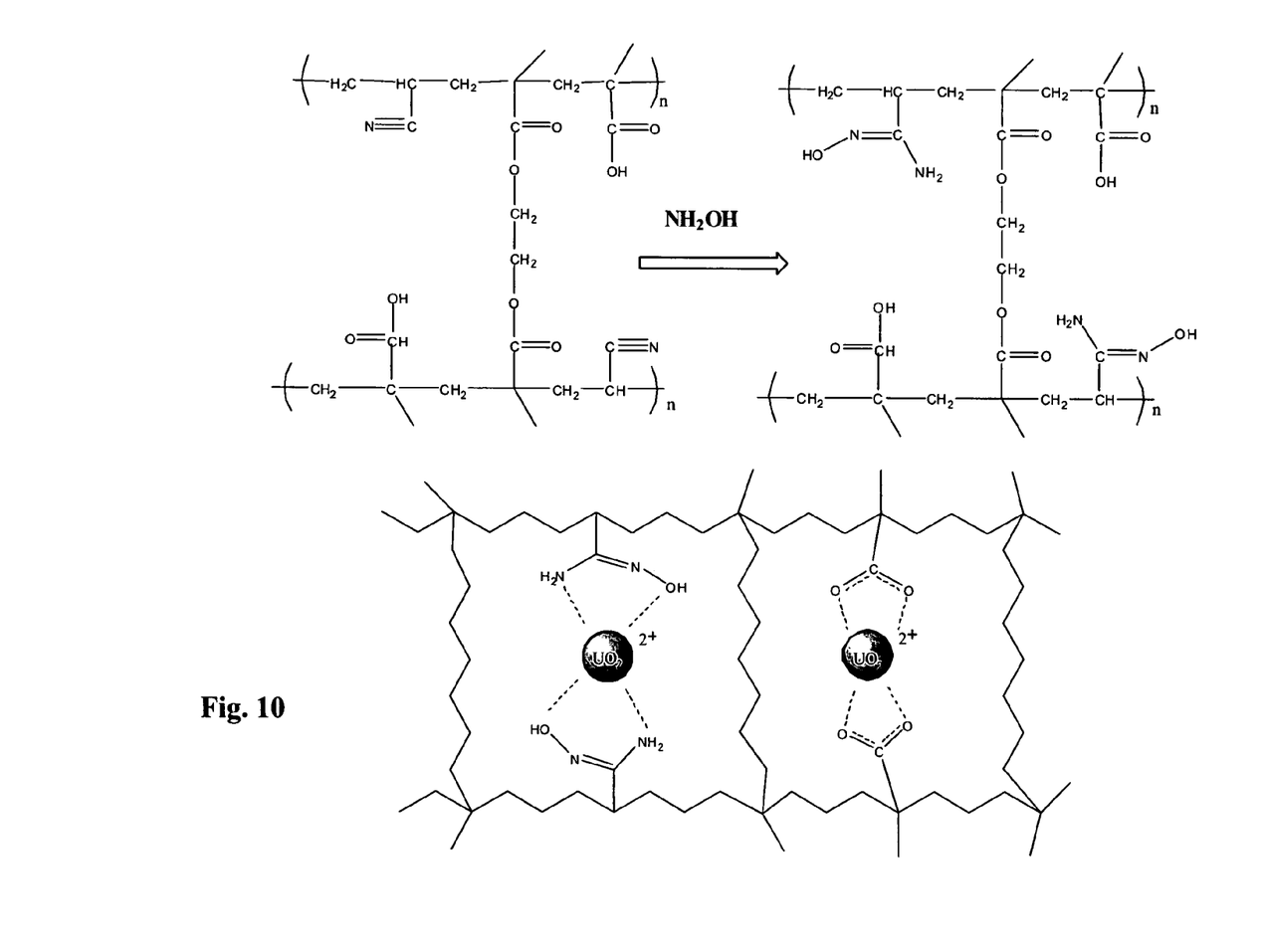
FIG. 10 illustrates the scheme of amidoximation reaction of p(AN-c-MAc) and the uranyl ion absorption mechanism.

These particles were synthesized as part of an immunoassay system for soluble $UO_2^{2+}$. One of the negative controls required for our environmental immunoassay system was a groundwater sample from which all the $UO_2^{2+}$ had been removed. Thus, the particles were compared to a commercially available resin for their ability to rapidly and selectively remove uranium from a $UO_2^{2+}$-spiked groundwater sample. Preliminary experiments were performed to compare two commercially available U-binding resins, UTEVA® and TRU®, for their ability to rapidly absorb $UO_2^{2+}$ from our spiked groundwater samples. The TRU® resin showed faster kinetics in our experimental protocol (data not shown) and this resin was used for all further comparisons. Dynamic light scattering of the AN-based particles suspended in artificial groundwater at concentrations similar to those in our absorption studies showed that the particles formed aggregates with diameters between 1 and 50 μm (data shown in FIG. 9); thus filtration through a 0.2 μm filter was sufficient to remove both the commercial resin and the AN-based particles from our experimental samples. The kinetics of $UO_2^{2+}$ removal was then directly compared for two of the newly synthesized submicron particles and the TRU® resin, as shown in FIG. 8. Both of the amidoximated particles tested in these experiments (HEMA and MAc coated p(AN)) absorbed $UO_2^{2+}$ much more rapidly than the commercially available resin; in fact, almost all of the spiked $UO_2^{2+}$ had been removed by the time the first sample could be collected (1 minute after addition). Experiments were subsequently performed to estimate the $UO_2^{2+}$-binding capacity of the amidoximated p(AN-c-MAc) particle preparation. When groundwater spiked with 1 ppm of $UO_2^{2+}$ was treated for 5 min with the lyophylized polymer at 16.7, 1.67, 0.167 mg dry weight/mL of sample, the uranium in each treated and filtered sample was below the limit of detection of our immunoassay (0.25 nM or 0.06 ppb). The capacity of the p(AN-c-MAc) particles for uranyl ions was exceeded when their concentration was lowered an additional 10-fold, to 0.0167 mg/mL; at this concentration of particles, approximately 14% of the uranium in the groundwater sample remained after 5 minutes of treatment.

The cation selectivity of the amidoximated p(ANcMAc) particles was investigated by determining the concentrations Na, Mg, Mn, Ca, and K before and after treatment with the particles, as shown in Table 1. Treatment of the spiked groundwater samples with 0.167 mg/mL of the particles (the lowest concentration that completely removed the $UO_2^{2+}$ from the sample) reduced the Na concentration by ~57% but had a negligible effect on the other major cations in the sample. If we added particles in 100-fold excess of what was required to remove the $UO_2^{2+}$ (16.7 mg/mL) then, in addition to the $UO_2^{2+}$, the particles also completely removed the Na from the sample and significantly reduced the Mg, Ca and Mn. The reduction in Na observed in these studies will be negligible in the performance of the antibody-based assay, since the groundwater samples are diluted from 1:25 to 1:100 into a physiological buffer containing 137 mM Na (3151 ppb) before analysis in the immunosensor.

5. Conclusions

AN-based particles in range of nanometer to micrometer can be prepared by a simple oil-in-water emulsion method by employing a seed polymerization technique. The copolymeric particles of AN with VP, HEMA, AAc and MAc can readily prepared by this method, which is an improvement over current synthetic methods. The AN-based particles showed a porous structure with a high surface area. Amidoximated derivatives of these particles were superior to a commercial resin in the speed at which they absorbed uranyl ions from spiked environmental water samples. Treatment of a spiked groundwater composite sample for 5 minutes or less with as little as 167 mg dry weight/L of the p(AN-c-MAc) particles was sufficient to reduce the $UO_2^{2+}$ concentration from 1 ppm to ≅0.06 ppb, with negligible effects on the concentrations of other divalent cations normally found in groundwater. Amidoximated copolymeric particles of AN with VP, HEMA, AAc and MAc may be useful for remediation of environmentally hazardous materials.

REFERENCES

1. Yu H, Jones R M, and Blake D A. International Journal of Environmental Analytical Chemistry 2005; 85(12-13): 817-830.
2. Blake R C, 2nd, Pavlov A R, Khosraviani M, Ensley H E, Kiefer G E, Yu H, Li X, and Blake D A. Bioconjugate Chemistry 2004; 15(5):1125-1136.
3. Blake R C, 2nd and Blake D A. Methods in Molecular Biology 2004; 248:417-430.
4. Smith J E, Wang L, and Tan W. TrAC, Trends in Analytical Chemistry 2006; 25(9):848-855.
5. Venditti F, Angelico R, Palazzo G, Colafemmina G, Ceglie A, and Lopez F. Langmuir 2007; 23(20):10063-10068.
6. Chin A B and Yaacob I I. Journal of Materials Processing Technology 2007; 191(1-3):235-237.
7. Chen Q, Shen X, and Gao H. Journal of Colloid and Interface Science 2007; 312(2):272-278.
8. Chen Q, Shen X, and Gao H. Journal of Colloid and Interface Science 2007; 308(2):491-499.
9. Andersson M, Kiselev A, Oesterlund L, and Palmqvist A E C. Journal of Physical Chemistry C 2007; 111(18):6789-6797.
10. Sahiner N and Singh M. Polymer 2007; 48(10):2827-2834.
11. Brandl F, Sommer F, and Goepferich A. Biomaterials 2007; 28(2):134-146.
12. Chern C S. Progress in Polymer Science 2006; 31(5):443-486.
13. Sundberg D C and Durant Y G. Polymer Reaction Engineering 2003; 11(3):379-432.
14. Kopecek J and Yang J. Polymer International 2007; 56(9): 1078-1098.
15. Meiring J E, Schmid M J, Grayson S M, Rathsack B M, Johnson D M, Kirby R, Kannappan R, Manthiram K, Hsia B, Hogan Z L, Ellington A D, Pishko M V, and Willson C G. Chemistry of Materials 2004; 16(26):5574-5580.

16. Sahiner N. Colloid and Polymer Science 2006; 285(3): 283-292.
17. Rodriguez E and Katime I. Journal of Applied Polymer Science 2003; 90(2):530-536.
18. Takahashi K, Miyamori S, Uyama H, and Kobayashi S. Macromolecular Rapid Communications 1997; 18(6):471-475.
19. Nomura M, Tobita H, and Suzuki K Advances in Polymer Science 2005; 175(Polymer Particles):1-128.
20. Andersson M, Hietala S, Tenhu H, and Maunu S L. Colloid and Polymer Science 2006; 284(11):1255-1263.
21. Xiao X-C, Chu L-Y, Chen W-M, Wang S, and Xie R. Langmuir 2004; 20(13):5247-5253.
22. Kim J-W, Park J-G, Ryu J-H, Chang I-S, and Suh K-D. Colloid and Polymer Science 2005; 283(11):1233-1240.
23. Okubo M, Fujibayashi T, Yamada M, and Minami H. Colloid and Polymer Science 2005; 283(9):1041-1045.
24. Jones C D and Lyon L A. Macromolecules 2000; 33(22):8301-8306.
25. Liu W-J, He W-D, Wang Y-M, Wang D, and Zhang Z-C. Polymer International 2006; 55(5):520-524.
26. Zhang H-T, Huang H, Sun R, and Huang J-X. Journal of Applied Polymer Science 2006; 99(6):3586-3591.
27. Blake D A, Pavlov A R, Yu H, Kohsraviani M, Ensley H E, and Blake R C, 2nd. Analytica Chimica Acta 2001; 444(1):3-11.
28. Sahiner N, Pekel N, and Guven O. Radiation Physics and Chemistry 1998; 52(1-6):271-276.
30. Guler H, Sahiner N, Aycik G A, and Goven O. Journal of Applied Polymer Science 1997; 66(13):2475-2480.
31. Sahiner N, Yu H, Tan G, He J, John V T, and Blake D A. Highly porous acrylonitrile-based functional hydrogel particles. 235th ACS National Meeting. New Orleans, La. USA: ACS, 2008.
32. Sahiner N, Alb A M, Graves R, Mandal T, McPherson G L, Reed W F, and John V T. Polymer 2007; 48(3):704-711.

In another embodiment of the invention, a method of using said highly porous acrylonitrile-based micron- and submicron-sized hydrogel particles to remove uranyl ions from wastewater is provided.

In another embodiment of the invention, a method of using said highly porous acrylonitrile-based micron- and submicron-sized hydrogel particles to detect the presence of uranyl ions in environmental samples is provided.

In another embodiment of the invention, a method of using said highly porous acrylonitrile-based micron- and submicron-sized hydrogel particles to detect the presence of uranyl ions in biological samples is provided.

The following references are incorporated herein by reference:

Blake, Diane A., et al. (2008) "Detection of hexavalent uranium with inline and field-portable immunosensors". Uranium Mining and Hydrogeology V: 49-58 (presented during a conference held 14-18 Sep. 2008 in Freiberg, Germany (Broder J. Merkel, Andrea Hasche-Berger, Conference Organizers));

Sahiner, N., Yu, H., Tan, G., He, J., John, V. T., Blake, D. A., "Acrylonitrile-based functional Hydrogel Particles" Abstracts of Papers, POLY-225, 235th ACS National Meeting, New Orleans, La., USA, Apr. 6-10, (2008) (available from ACS).

All measurements disclosed herein are at standard temperature and pressure, at sea level on Earth, unless indicated otherwise.

The foregoing embodiments are presented by way of example only; the scope of the present invention is to be limited only by the following claims.

The invention claimed is:

1. A method of preparing acrylonitrile-based micron-sized and submicron-sized hydrogel particles, comprising the steps of:

TABLE 1

Cation[1] selectivity of amidoximated p(AN-c-MAc) particles

| Sample | Na | Mg | Ca | Mn | K |
|---|---|---|---|---|---|
| Control | 2461 ± 126 | 2480 ± 11 | 172128 ± 113 | 106 ± 3 | 567 ± 118 |
| Treated with 0.167 mg/mL | 1055 ± 131 | 2433 ± 61 | 181538 ± 6533 | 108 ± 4 | 640 ± 27 |
| Treated with 16.7 mg/mL | nd[2] | 1871 ± 94 | 98811 ± 155 | 4 ± 0.2 | 693 ± 30 |

[1]Cation concentrations are reported as μg/L (ppb).
[2]Not detected (below the blank value for the instrument)

In one embodiment of the invention, a novel composition of matter for highly porous acrylonitrile-based micron- and submicron-sized hydrogel particles is provided.

In another embodiment of the invention, a method of synthesizing highly porous acrylonitrile-based micron- and submicron-sized hydrogel particles is provided.

In another embodiment of the invention, the pore size of submicron particles can be controlled by the extent of crosslinker used during the synthesis.

In another embodiment of the invention, porous particles with different architecture can be prepared by layering different materials such as (core-shell1-shell2) etc. with different hydrophilic and hydrophobic monomers or the same monomers used in this invention.

In another embodiment of the invention, a method of using said highly porous acrylonitrile-based micron- and submicron-sized hydrogel particles to remove uranyl ions from groundwater is provided.

a) forming micron or submicron particles by polymerization of acrylonitrile or a copolymer of acrylonitrile;
b) coating the particles with a hydrophilic layer, wherein the monomer for the hydrophilic layer is selected from the group consisting of 1-vinyl 2-pyrrolidone, 2-hydroxy ethylmethacrylate, acrylic acid, and methacrylic acid.

2. A method of removing uranium ions from water, comprising:
mixing acrylonitrile-based micron-sized and submicron-sized hydrogel particles with water containing uranium ions to remove uranium ions from the water, the particles being made by a method comprising the steps of:
a) forming micron or submicron particles by polymerization of acrylonitrile or a copolymer of acrylonitrile;
b) coating the particles with a hydrophilic layer.

3. The method of claim 2 wherein the water is groundwater.
4. The method of claim 2 wherein the water is wastewater.
5. The method of claim 2 wherein the water is drinking water.

6. A method of testing for the presence of uranium ions in environmental samples, comprising:
   (a) preparing acrylonitrile-based micron-sized and submicron-sized hydrogel particles by a method comprising the steps of:
      i) forming micron or submicron particles by polymerization of acrylonitrile or a copolymer of acrylonitrile; and
      ii) coating the particles with a hydrophilic layer; and
   (b) mixing the particles with an environmental sample to create a mixture, and analyzing the mixture for the presence of uranium ions.

7. A method of testing for the presence of uranium ions in biological samples, comprising:
   (a) preparing acrylonitrile-based micron-sized and submicron-sized hydrogel particles by a method comprising the steps of:
      i) forming micron or submicron particles by polymerization of acrylonitrile or a copolymer of acrylonitrile; and
      ii) coating the particles with a hydrophilic layer; and
   (b) mixing the particles with a biological sample to create a mixture, and analyzing the mixture for the presence of uranium ions.

8. A method of synthesizing hydrogel particles, comprising the steps of:
   a) synthesizing micron or submicron hydrogel particles through a miniemulsion process;
   b) preparing co-polymeric micron or submicron particles; and
   c) amidoximating the micron or submicron particles.

9. The method of claim 8 wherein the particles are highly porous.

10. A method of removing uranium ions from water, comprising:
   mixing the particles made by the method of claim 8 with water containing uranium ions to remove uranium ions from the water.

11. The method of claim 10 wherein the water is groundwater.

12. The method of claim 10 wherein the water is wastewater.

13. The method of claim 10 wherein the water is drinking water.

14. A method of testing for the presence of uranium ions in environmental samples, comprising mixing the particles produced by the method of claim 8 with an environmental sample to create a mixture and analyzing the mixture for the presence of uranium ions.

15. A method of testing for the presence of uranium ions in biological samples, comprising mixing the particles produced by the method of claim 8 with a biological sample to create a mixture, and analyzing the mixture for the presence of uranium ions.

16. The method of claim 8 wherein in step "a" the particles measure between about 50 nanometers and 20 micrometers.

17. The method of claim 8 wherein the particles have porosity with a pore size, and the pore size of the porosity of the particles is between about 5 nanometers and 250 nanometers.

18. A method of water treatment, comprising:
   a) contacting a volume of water with acrylonitrile based hydrogel particles, each having a hydrophilic layer coating and each having a size of between about 10 nanometers and 10 micrometers;
   b) wherein the concentration of said particles is between about 20 micrograms and 20 milligrams per ml; and
   c) wherein the contact of step "a" is for a time period of between about 1 second and 60 minutes.

19. The method of claim 18, wherein the water is wastewater.

20. The method of claim 18, wherein the water is groundwater.

21. The method of claim 18, wherein the water is drinking water.

22. A method of removing uranium ions from water, comprising:
   mixing the particles made by the method of claim 1 with water containing uranium ions to remove uranium ions from the water.

23. The method of claim 22 wherein the water is groundwater.

24. The method of claim 22 wherein the water is wastewater.

25. The method of claim 22 wherein the water is drinking water.

* * * * *